(12) United States Patent
Epstein et al.

(10) Patent No.: US 8,869,603 B2
(45) Date of Patent: Oct. 28, 2014

(54) DEBRIS DETECTION IN TURBOMACHINERY AND GAS TURBINE ENGINES

(75) Inventors: Alan H. Epstein, Lexington, MA (US); Elizabeth A. Mitchell, Marlborough, CT (US)

(73) Assignee: United Technologies Corporation, Hartford, CT (US)

( * ) Notice: Subject to any disclaimer, the term of this patent is extended or adjusted under 35 U.S.C. 154(b) by 162 days.

(21) Appl. No.: 13/409,036

(22) Filed: Feb. 29, 2012

(65) Prior Publication Data

US 2013/0220004 A1     Aug. 29, 2013

(51) Int. Cl.
*G01M 15/14*     (2006.01)

(52) U.S. Cl.
USPC ..................... 73/112.06; 73/112.03

(58) Field of Classification Search
USPC ............... 73/112.01, 112.03, 112.05, 112.06
See application file for complete search history.

(56) References Cited

U.S. PATENT DOCUMENTS

| | | | |
|---|---|---|---|
| 560,254 A | 5/1896 | Bonderson | |
| 4,226,369 A | 10/1980 | Botts et al. | |
| 4,607,228 A | 8/1986 | Reif | |
| 5,033,151 A | 7/1991 | Kraft et al. | |
| 5,050,081 A | 9/1991 | Abbott et al. | |
| 5,365,445 A | 11/1994 | Takizawa | |
| 5,571,946 A | 11/1996 | Koshi et al. | |
| 5,654,700 A | 8/1997 | Prata et al. | |
| 5,800,077 A | 9/1998 | March | |
| 6,489,775 B1 | 12/2002 | Righy et al. | |
| 7,383,131 B1 | 6/2008 | Wey et al. | |
| 7,535,565 B1 | 5/2009 | Viertl et al. | |
| 7,805,947 B2 | 10/2010 | Moulebhar | |
| 7,858,952 B2 | 12/2010 | Feist et al. | |
| 7,886,875 B2 * | 2/2011 | Shevchencko et al. | 184/6.11 |
| 8,256,277 B2 * | 9/2012 | Khibnik et al. | 73/112.01 |
| 8,459,103 B2 * | 6/2013 | Khibnik et al. | 73/112.01 |
| 2007/0048122 A1 | 3/2007 | Van Suetendael, IV et al. | |
| 2009/0014245 A1 * | 1/2009 | Shevchenko et al. | 184/6.4 |
| 2010/0287907 A1 | 11/2010 | Agrawal et al. | |
| 2010/0288034 A1 * | 11/2010 | Agrawal et al. | 73/112.01 |
| 2010/0292905 A1 | 11/2010 | Agrawal et al. | |
| 2010/0313639 A1 | 12/2010 | Khibuik et al. | |
| 2011/0010071 A1 | 1/2011 | Rhodes et al. | |
| 2011/0079015 A1 | 4/2011 | Geis et al. | |
| 2011/0247406 A1 | 10/2011 | Grosse-Laxzen et al. | |

FOREIGN PATENT DOCUMENTS

JP     2010229921     10/2010

OTHER PUBLICATIONS

International Search Report and Written Opinion for International Application No. PCT/US2013/026541 completed Nov. 21, 2013.

* cited by examiner

*Primary Examiner* — Eric S McCall
(74) *Attorney, Agent, or Firm* — Carlson, Gaskey & Olds P.C.

(57) ABSTRACT

An exemplary debris detection method according to one example embodiment of the present disclosure includes, among other things, monitoring turbomachine performance, and initiating a debris warning when an actual rate of change in turbomachine performance varies from a predicted rate of change in the performance.

22 Claims, 3 Drawing Sheets

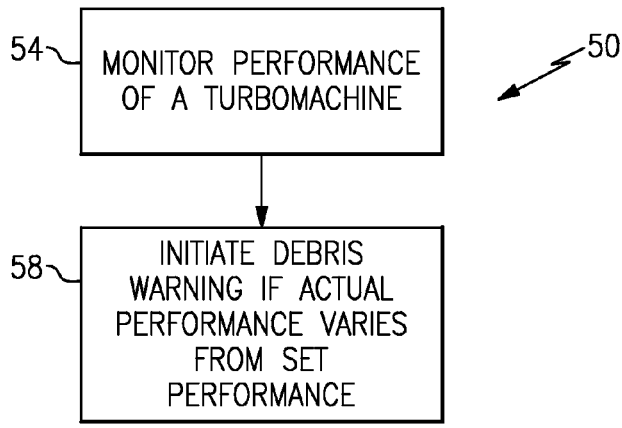
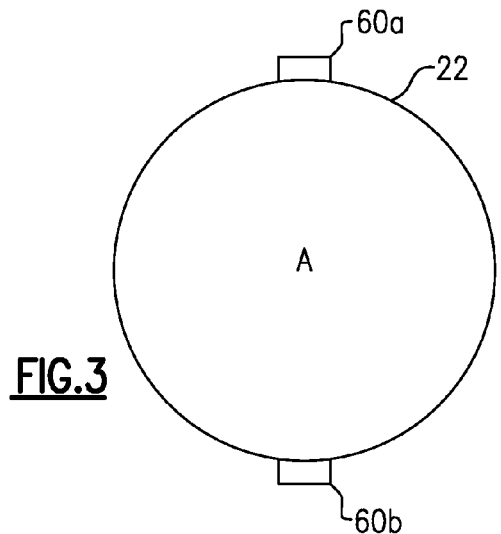
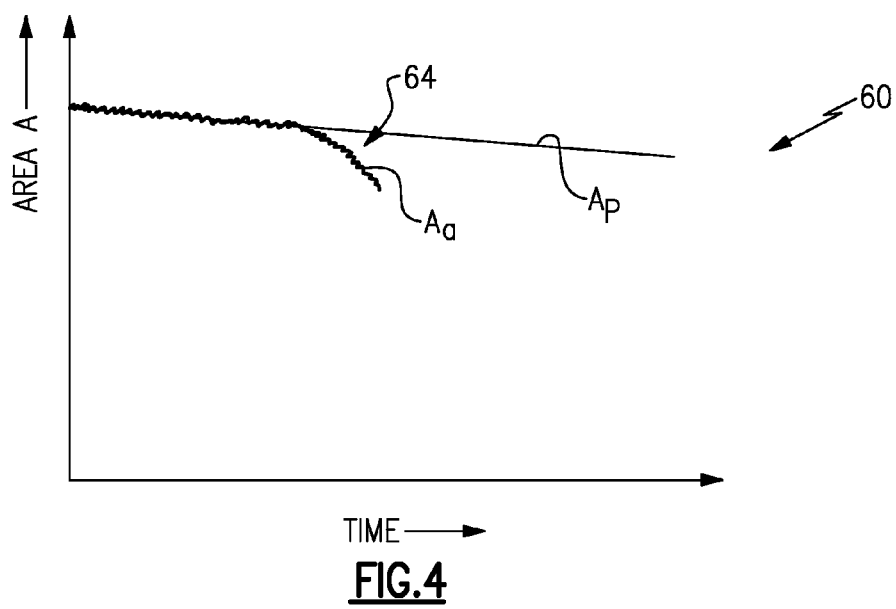

DEBRIS DETECTION IN TURBOMACHINERY AND GAS TURBINE ENGINES

BACKGROUND

This disclosure relates generally to monitoring debris and, more particularly, to detecting debris, such as volcanic ash, within a gas turbine engine and turbomachinery.

Gas turbine engines include a compressor section, a combustor section, and a turbine section, and may include a fan section. Gas turbines generally use turbomachine implementations of compressor, turbines, and fans. Such engines may be arranged mechanically such that the compressor and turbine sections are split into one or more subsections which are mechanically interconnected in various arrangements. These subsections are often denoted as spools. Engines commonly consist of one, two, or three spools, although more are possible. When used for aircraft propulsion, these engines may employ a geared architecture connecting the fan section and the turbine section. Gas turbine engines are commonly used to propel aircraft, power ground and sea vehicles, and to generate power.

Aircraft operate in various environments. Some environments include debris, such as volcanic ash, dust, and sand. Debris can undesirably accelerate wear and erosion of the aircraft components, including components of the gas turbine engine. This wear can decrease engine efficiency. Some types of debris such as volcanic ash can clog internal passages in an engine so as to accelerate wear and damage, decrease power output, and even stop operation. The aircraft may be moved away from debris when debris is detected. Some debris, such as clouds of volcanic ash at night or ash embedded in clouds, may be difficult to detect. In some cases, there may be a pressing need to operate in the vicinity of such debris, but in general it is safer to avoid operating in known regions of high debris concentration.

Current ash detection methods rely on pilot observations such as visual identification, smells, and cockpit instrument fluctuations. Concerns with existing detection approaches include missed alarms and late alarms.

SUMMARY

A debris detector is disclosed which, in its most general form, infers the presence of debris harmful to turbomachine and gas turbine engine operation by examining specific changes in the performance of said engine or turbomachine. The detection accuracy may be improved by comparing the changes among additional engines that may be present in the vicinity (on the same aircraft for example) and by input from foreign object or particle detectors on the engine or aircraft.

An exemplary debris detection method according to one example embodiment of the present disclosure includes, among other things, monitoring turbomachine performance, and initiating a debris warning when an actual rate of change in turbomachine performance varies from a predicted rate of change in the performance.

In a further non-limiting embodiment of the forgoing debris detection method, the actual rate of change of turbomachine performance may be an actual rate of change in a turbine flow area, and the predicted rate of change of turbomachine performance may be a predicted rate of change in the turbine flow area.

In a further non-limiting embodiment of any of the forgoing debris detection methods, the actual rate of change of turbomachine performance may be an actual rate of degradation in a compressor efficiency of the turbomachine, and the predicted rate of change of turbomachine performance may be a predicted rate of degradation in the compressor efficiency of the turbomachine.

In a further non-limiting embodiment of any of the forgoing debris detection methods, the predicted rate of change in turbomachine performance may correspond to a rate of change in turbomachine performance during normal operation.

In a further non-limiting embodiment of any of the forgoing debris detection methods, the initiating may require the rate of change in turbomachine performance to vary from the predicted rate of change in turbomachine performance for a predicted time.

In a further non-limiting embodiment of any of the forgoing debris detection methods, the predicted time may be less than a single flight.

In a further non-limiting embodiment of any of the forgoing debris detection methods, the predicted time may be a minute or longer.

In a further non-limiting embodiment of any of the forgoing debris detection methods, the monitoring may comprise mapping a signal representing the rate of change in turbomachine performance, and the signal is filtered during the monitoring.

In a further non-limiting embodiment of any of the forgoing debris detection methods, the method may determine whether at least one debris sensor has detected debris prior to the initiating.

In a further non-limiting embodiment of any of the forgoing debris detection methods, the debris sensor may comprise a particle detector sensor, an optical sensor, an electrical charge sensor, or some combination of sensors.

In a further non-limiting embodiment of any of the forgoing debris detection methods, the method may adjust a type of the warning based on the rate.

In a further non-limiting embodiment of any of the forgoing debris detection methods, the method may determine whether another turbomachine has an actual rate of change in turbomachine performance that varies from a predicted rate of change in turbomachine performance prior to generating the debris warning.

In a further non-limiting embodiment of any of the forgoing debris detection methods, the turbomachine is a gas turbine engine.

A volcanic ash detection method according to another exemplary embodiment of the present disclosure includes, among other things, monitoring a rate of change in a surge margin of an engine during operation of the engine, and initiating a warning indicating a detection of volcanic ash when an actual rate of change in the surge margin varies from a predicted rate of change in the surge margin.

In a further non-limiting embodiment of the forgoing volcanic ash detection method, the rate of change in the surge margin may be determined by monitoring a turbine flow area change of the engine.

In a further non-limiting embodiment of any of the forgoing debris detection methods, the rate of change in the surge margin may be determined by monitoring a change of the efficiency of the engine.

In a further non-limiting embodiment of any of the forgoing debris detection methods, the rate of change in the surge margin may be determined by monitoring a change of compressor efficiency of the engine.

In a further non-limiting embodiment of any of the forgoing debris detection methods, the predicted rate of change may correspond to a rate of change in the surge margin during normal operation.

In a further non-limiting embodiment of any of the forgoing debris detection methods, the initiating requires the actual rate of change in the surge margin to vary from the predicted rate of change in the surge margin for a predicted time.

In a further non-limiting embodiment of any of the forgoing debris detection methods, the predicted time may be less than a single flight.

A debris monitoring system according to an exemplary aspect of the present disclosure includes, among other things, a plurality of sensors that monitor conditions within an engine, the conditions indicating a rate of change in a turbine flow area of an engine, a rate of change in the compressor efficiency of the engine, a rate of change in the turbine efficiency, a rate of change of engine efficiency, or some combination of these; a warning device; and a controller that is operatively coupled to the plurality of sensors and the warning mechanism, the controller configured to initiate a warning of debris using the warning device.

In a further non-limiting embodiment of the forgoing debris monitoring system, the warning device is a visual warning viewed by an operator of an aircraft propelled by the engine.

DESCRIPTION OF THE FIGURES

The various features and advantages of the disclosed examples will become apparent to those skilled in the art from the detailed description. The figures that accompany the detailed description can be briefly described as follows:

FIG. 2 shows an example method of detecting debris in the FIG. 1 engine.

FIG. 3 shows a highly schematic section view in a turbine section of the FIG. 1 engine.

FIG. 4 shows a graphical representation of predicted and actual flow areas through the turbine section of FIG. 3.

DETAILED DESCRIPTION

Figure 1:
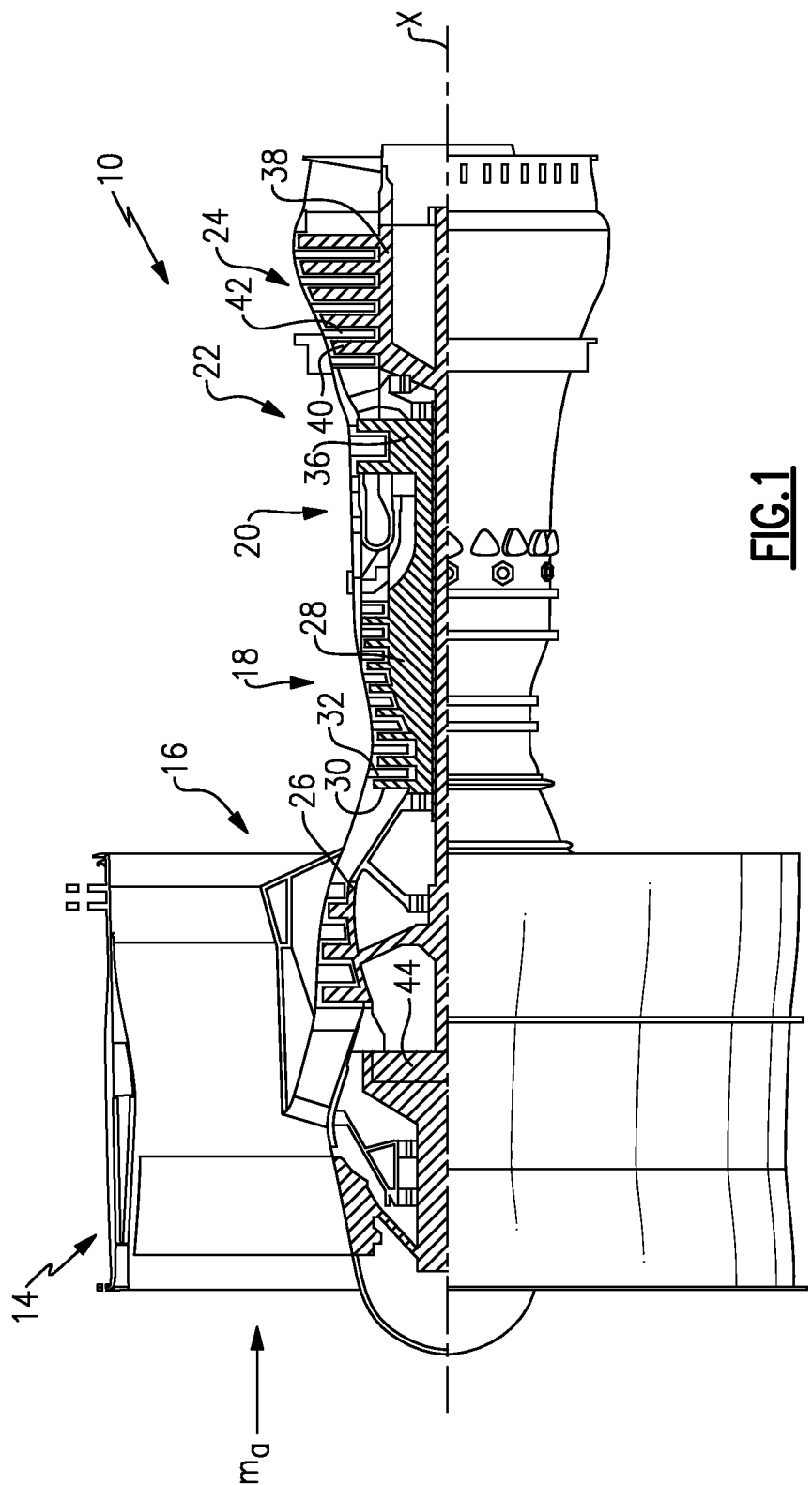
FIG. 1 shows a schematic view of an example gas turbine engine.

Referring to FIG. 1, a gas turbine engine 10 is an example turbomachine. The engine 10 is used alone or in combination with other engines to propel an aircraft.

The engine 10 is circumferentially disposed about an axis X. The gas turbine engine 10 includes a fan section 14, a low-pressure compressor section 16, a high-pressure compressor section 18, a combustion section 20, a high-pressure turbine section 22, and a low-pressure turbine section 24. Other example engine may include more or fewer sections.

During operation, flow ma of air moves into the engine 10 via the fan 14. The air is compressed in the low-pressure compressor section 16 and the high-pressure compressor section 18. The compressed air is then mixed with fuel and burned in the combustion section 20. The products of combustion are expanded across the high-pressure turbine section 22 and the low-pressure turbine section 24.

The low-pressure compressor section 16 includes a rotor 26. The high-pressure compressor section 18 includes a rotor 28. The rotors 26 and 28 are configured to rotate about the axis X. The example rotors 26 and 28 include rows or rotatable airfoils or rotating blades 30 alternating with rows of static airfoils or static blades 32.

The high-pressure turbine section 22 includes a rotor 36 coupled to the rotor 28. The low-pressure turbine section 24 includes a rotor 38 coupled to the rotor 26. The rotors 36 and 38 are configured to rotate about the axis X in response to expansion to drive the rotors 26 and 28 of the high-pressure compressor section 18 and the low-pressure compressor section 16, respectively. The example rotors 36 and 38 include rows of rotatable airfoils or rotatable blades 40 alternating with rows of static airfoils or static blades 42. Notably, the rotor 26 may rotate a geared architecture 44 to rotate a fan of the fan section 14.

The examples of this disclosure are not limited to implementation in the two-spool gas turbine architecture described, and may be used in other architectures, such as a single-spool axial design, a three-spool axial design, and still other architectures. That is, there are various types of gas turbine engines, and other turbomachines, that can benefit from the examples disclosed herein.

Referring to FIGS. 2 to 4 with continuing reference to FIG. 1, an example debris detection method 50 includes monitoring performance of a turbomachine, such as the engine 10, at a step 54. The method 50 generates a debris warning at a step 58 if an actual rate of change in turbomachine performance varies from a predicted rate of change in turbomachine performance.

As known, the high-pressure turbine section 22 of the engine 10 has a flow area A. The flow area A changes relatively slowly at a predicted rate $A_p$ over time. The predicted rate $A_p$ is predicted based on historical information, typical component degradation rates, etc. While generic empirical data on an engine type may be used to determine the predicted rate $A_p$, a prediction may be more accurate when historical data from the engine being monitored is utilized. The predicted rate $A_p$ is essentially a prediction of the rate of change in the flow area A during normal operation of the engine 10, which may be positive, negative, or zero.

In one example, the method 50 compares an actual rate $A_a$ of change in the flow area A to the predicted rate $A_p$ of change in the flow area A. If the actual rate $A_a$ drops relative to the predicted rate $A_p$, the method 50 initiates the warning at the step 58.

Sensors 60a and 60b are used in this example to monitor the relative size of the flow area A in real time. A person having skill in this art and the benefit of this disclosure would understand sensors suitable for such monitoring.

A graph 60 shows the changes in the predicted rate $A_p$ and the actual rate $A_a$. During normal operation of the engine 10, the flow area A changes very slowly, if at all, which is why the graph of the predicted rate $A_p$ has little slope. A drop 64 in the $A_a$ relative to the $A_p$ represents a variation that would result in the method 50 initiating a warning. In some examples, the drop 64 must be sustained for a specified amount of time, say 1-5 minutes, before the method 50 initiates the warning. The specified amount of time is less than one flight in some examples.

In one more specific example, the drop 64 is a variation in the $A_a$ relative to the $A_p$ that is greater than 1-5% as detected over a specified period of 1-60 minutes.

The warning may take many forms. In one example, the warning includes an audible alarm and a visual alarm, such as a flashing light. The audible alarm and the visual alarm are intended to alert a pilot of an aircraft propelled by the engine 10. Typically, this alarm could be implemented through the aircraft flight control system upon receiving warning from the debris detector described herein. Such a warning could be presented in a manner consistent with other safety of flight alarms. The pilot may take corrective action based on the warning, such as changing a course of the aircraft, even reversing course. Other examples of corrective action include changing altitude, throttling the engine 10 back to a low cruise or idle speed, or cycling the throttles.

In this example, the drop 64 is consistent with an actual rate of change $A_a$ when the engine 10 is moving through an ash cloud. When ash concentrations are relatively high, ash deposits and accumulate on hot section components of the engine 10, which reduces the effective area A. Reductions in the area A raises the operating line of the engine 10, and thus reduce the surge margin of the engine 10. Other deleterious effects may include changing the thrust of the engine and raising the internal temperatures.

Instead of moving through the ash cloud, the drop 64 may alternatively be due to mechanical failure of the engine 10. In either case, the warning is useful.

As can be appreciated, the signal corresponding to the $A_a$ is relatively noisy. The method 50 may include the step of filtering the signal prior to generating the warning at the step 58. Filtering the signal may reduce faulty warnings due to signal variation rather than actual reductions in the area A. Filtering the signal has a smoothing effect on the signal corresponding to the $A_a$.

The method 50 may be utilized in connection with a multi-engine aircraft. In such examples, the method 50 may determine whether engines of the aircraft other than the engine 10 have experienced a similar drop prior to generating the warning at the step 58. As can be appreciated, if flight though an ash cloud is sufficient to cause the drop 64, other engines of the aircraft will experience similar drops. Determining whether other engines of the aircraft have experienced similar drops may help identify the cause as volcanic ash or a mechanical failure of an individual engine of the aircraft. Similar indications from more than one engine reduces uncertainty and raises the severity of the alarm.

The method 50 may include also determine whether at least one debris sensor associated with the engine 10 has detected debris, such as ash, prior to generating the warning at the step 58. The debris sensor may be a particle detector sensor, an electrical charge sensor, an optical sensor, or some other type of sensor.

The method 50 may include the step of adjusting the warning based on the severity of the drop 64. For example, a steep drop in a relatively short time may cause the method 50 to generate a higher alert warning, whereas as a more gradual drop over a longer time may cause the method 50 to generate a lower alert warning. A response to the higher alert warning may include changing a course of the aircraft having the engine 10. A response to the lower alert warning may include an additional maintenance check of the engine 10 when the aircraft having the engine 10 has landed.

Each of the above-mentioned supplemental features to the method 50, (i.e., filtering, checking other engines, checking sensors, etc.) may be used together or individually with the method 50.

Figure 5:
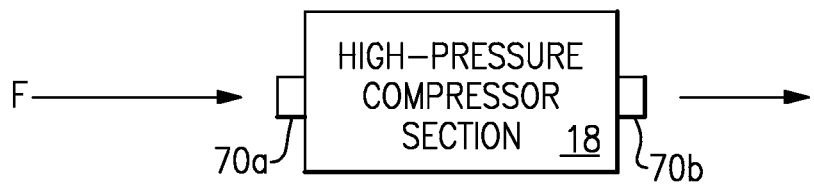
FIG. 5 shows a section view of a compressor section of the FIG. 1 engine.
Figure 6:
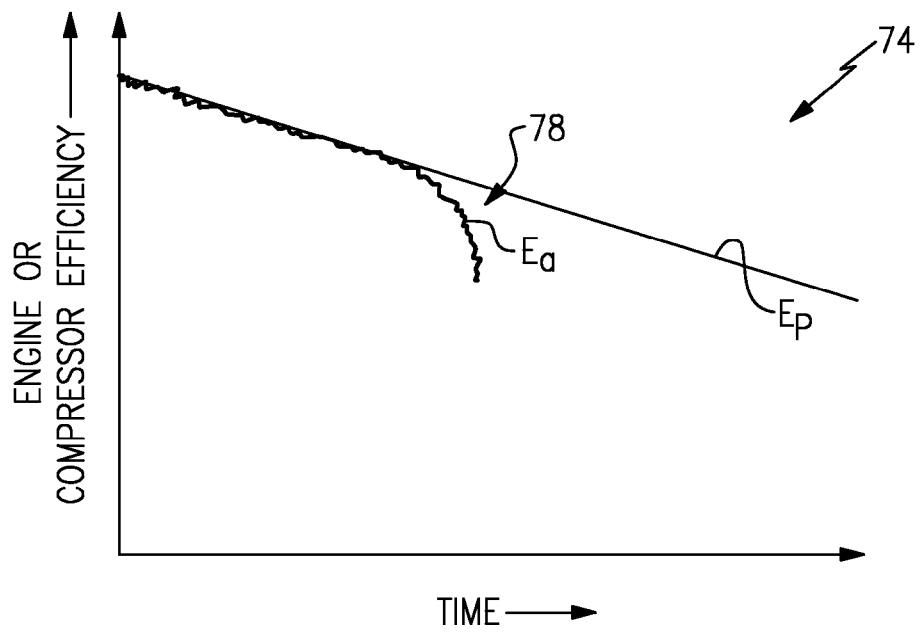
FIG. 6 shows a graphical representation of predicted and actual efficiencies of the compressor section of FIG. 5.

Referring now to FIGS. 5 and 6 with continuing reference to FIGS. 1 and 2, in another example of the method 50 relies on a change in engine efficiency to determine engine performance. In such an example, the actual rate of change of engine performance is an actual rate of degradation in engine efficiency, and the predicted rate of change of engine performance is a predicted rate of degradation in the engine efficiency. Such a change in engine efficiency may stem from changes in compressor efficiency, turbine efficiency, clogging of passages, or some combination of these.

Sensors 70a and 70b are positioned at the respective inlet and the exit of the high-pressure compressor section 18. The sensors 70a and 70b are used in a known manner to measure the efficiency of the high-pressure compressor section 18.

A graph 74 shows the changes in the predicted rate $E_p$ and the actual rate $E_a$. During normal operation of the engine 10, the engine or compressor efficiency decreases at a predicted rate $E_p$. A drop 78 in the $E_a$ relative to the $E_p$ represents a variation that would generate a warning.

In this example, the drop 78 is consistent with an actual rate of change $E_a$ when the engine 10 is moving through an ash cloud. Relatively high ash concentrations can reduce the efficiency of the engine 10, usually be reducing the engine or compressor efficiency, which can lead to loss of thrust. Reductions in these efficiencies can reduce the surge margin of the engine 10, leading to instability such as surge, which may damage or stop the engine. Notably, the drop 78 and the drop 64 both influence the surge margin of the engine 10.

In one specific example, the drop 78 is a variation in the $E_a$ relative to the $E_p$ that is greater than 1-5% as detected over a period of 1-60 minutes.

Changes in turbine flow area A, engine efficiency, compressor and turbine efficiency may be deduced from examining parameters of the engine 10. These parameters are commonly monitored as part of a typical engine control system and include, for example, fuel flow, pressures, pressure ratios (P3/P2, P3/P2.5), rotor speeds, temperatures, temperature ratio (T4.5/T2, T5/T2), etc. A person having skill in this art and the benefit of this disclosure would understand that changes in engine efficiency, turbine area, and compressor and turbine efficiency could be derived from such measurement.

Figure 7:
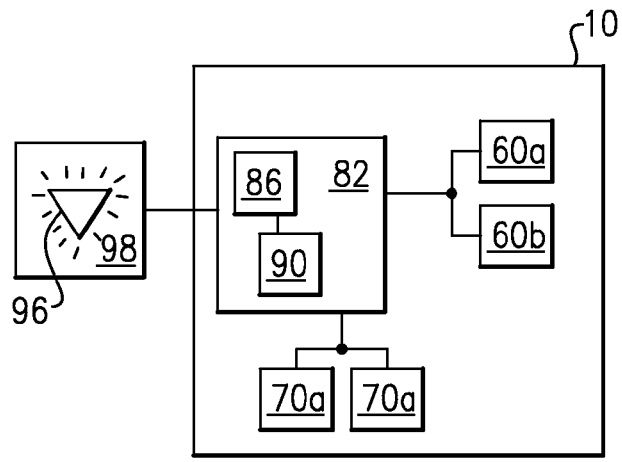
FIG. 7 shows a highly schematic view of a debris monitoring system for use with the FIG. 1 engine.

Referring to FIG. 7 with continuing reference to FIGS. 1 to 6, many computing devices can be used to implement various functions described herein. In some examples, a computer 82 is used.

In one example, the computer 82 includes a processor 86 that executes software 90 stored on a memory portion 92 of the computer. In some examples, the computer 82 resides in a fuel control computer of an aircraft, or is split amongst several separate computers. In some examples, each engine of a multi-engine aircraft separately calculates A (or some other turbomachine performance indicator) and then reports the result to a flight control computer, which makes comparisons between the engines to assess risk and determine whether to initiate a warning device 96. In some examples, the computer 82 comprises portions of a dual architecture micro server card.

The computer 82 is operatively connected to the warning device 96 in a cockpit 98 of an aircraft propelled by the engine 10. The warning device 96 is a warning light in this example. The warning device 96 can be viewed by a pilot or an operator of a flight control system.

In terms of hardware architecture, the computer 82 can additionally include one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as additional controllers, buffers (caches), drivers, repeaters, and receivers to enable communications. Further, the local interface may include address, control, and/or data connections to enable appropriate communications among the aforementioned components.

An example of the processor 86 used within the computer 82 executes software code, particularly software code stored in the memory portion 92. The processor 86 can be a custom made or commercially available processor, a central processing unit (CPU), an auxiliary processor among several processors associated with the computing device, a semiconductor based microprocessor (in the form of a microchip or chip predicted) or generally any device for executing software instructions.

The memory portion 92 can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. Note that the memory can also have a distributed architecture, where various components are situated remotely from one another, but can be accessed by the processor.

The software in the memory portion 92 may include one or more additional or separate programs, each of which includes an ordered listing of executable instructions for implementing logical functions. A system component embodied as software may also be construed as a source program, executable program (object code), script, or any other entity comprising a predicted of instructions to be performed. When constructed as a source program, the program is translated via a compiler, assembler, interpreter, or the like, which may or may not be included within the memory.

The Input/Output devices that may be coupled to system I/O Interface(s) may include input devices, for example but not limited to, a keyboard, mouse, scanner, microphone, camera, proximity device, etc. Further, the Input/Output devices may also include output devices, for example but not limited to, a printer, display, etc. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

In some examples, the computer 82, or a portion of the computer 82, is ground-based and separate from the aircraft propelled by the engine 10. In such examples, data may be telemetered to the ground-based computer where the data is processed an analyzed. If required, the ground-based computer than uplinks a warning to the aircraft propelled by the engine 10.

Features of the disclosed examples include a method of detecting debris in gas turbine engine utilizing no or relatively few specialized components. Although sensors 70a, 70b, 60a, and 60b are shown, there need not be specialized sensors for use exclusively with the disclosed examples. That is, the disclosed examples may utilize sensors that are already present in turbomachines. In some examples, the conditions indicating rate of change in turbine flow area of an engine, rate of change in compressor efficiency of the engine, rate of change in turbine efficiency, rate of change of engine efficiency, etc., can be derived or calculated from existing sensors in modern engines.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. A debris detection method, comprising:
   (a) monitoring turbomachine performance; and
   (b) initiating a debris warning when an actual rate of change in turbomachine performance varies from a predicted rate of change in the performance, wherein the actual rate of change in turbomachine performance is an actual rate of degradation in turbomachine efficiency, and the predicted rate of change in the performance is a predicted rate of degradation in turbomachine efficiency.

2. The debris detection method of claim 1, wherein the actual rate of change of turbomachine performance is an actual rate of reduction in a turbine flow area, and the predicted rate of change of turbomachine performance is a predicted rate of change in the turbine flow area.

3. The debris detection method of claim 1, wherein the actual rate of change of turbomachine performance is an actual rate of degradation in a compressor efficiency of the turbomachine, and the predicted rate of change in the performance is a predicted rate of degradation in the compressor efficiency of the turbomachine.

4. The debris detection method of claim 1, wherein the predicted rate of change in turbomachine performance corresponds to a rate of change in turbomachine performance during normal operation.

5. The debris detection method of claim 1, wherein the monitoring comprises mapping a signal representing the rate of change in turbomachine performance and the signal is filtered during the monitoring.

6. The debris detection method of claim 1, including adjusting a type of the warning based on the rate.

7. The debris detection method of claim 1, wherein the turbomachine is a gas turbine engine.

8. The debris detection method of claim 1, wherein the initiating requires the rate of change in turbomachine performance to vary from the predicted rate of change in turbomachine performance for a predicted time.

9. The debris detection method of claim 8, wherein the predicted time is less than a single flight.

10. The debris detection method of claim 1, including determining whether at least one debris sensor has detected debris prior to the initiating.

11. The debris detection method of claim 10, wherein the at least one debris sensor comprises a particle detector sensor, an electrical charge sensor, an optical sensor, or some combination of sensors.

12. A debris detection method, comprising:
    (a) monitoring turbomachine. performance;
    (b) initiating a debris warning when an actual rate of change in turbomachine performance varies from a predicted rate of change in the performance, wherein the actual rate of change in turbomachine performance is an actual rate of degradation in turbomachine efficiency, and the predicted rate of change in the performance is a predicted rate of degradation in turbomachine efficiency; and
    (c) determining whether another turbomachine has an actual rate of change in turbomachine performance that varies from a predicted rate of change in turbomachine performance prior to generating the debris warning.

13. A volcanic ash detection method, comprising:
    (a) monitoring a rate of change in a surge margin of an engine during operation of the engine; and (b) initiating a warning indicating a detection of volcanic ash when an actual rate of change in the surge margin varies from a predicted rate of change in the surge margin.

14. The volcanic ash detection method of claim 13, wherein the rate of change in the surge margin is determined by monitoring a turbine flow area change of the engine.

15. The volcanic ash detection method of claim 13, wherein the wherein the rate of change in the surge margin is determined by monitoring a change of compressor efficiency of the engine.

16. The volcanic ash detection method of claim 13, wherein the predicted rate of change corresponds to a rate of change in the surge margin during normal operation.

17. The volcanic ash detection method of claim 13, including determining whether another engine has an actual rate of change in the surge margin that varies from the predicted rate of change in the surge margin prior to generating the warning.

18. The volcanic ash detection method of claim 13, wherein the initiating requires the actual rate of change in the surge margin to vary from the predicted rate of change in the surge margin for a predicted time.

19. The volcanic ash detection method of claim 18, wherein the predicted time is less than a single flight.

20. A debris monitoring system, comprising:
a plurality of sensors that monitor conditions of an engine, the conditions indicating a rate of change in a turbine flow area of an engine, a rate of change in the compressor efficiency of the engine, a rate of change in the turbine efficiency, or some combination of the rate of change in the turbine flow area, the rate of change in the compressor efficiency, and the rate of Chan. e in the turbine efficiency;
a warning device; and
a controller that is operatively coupled to the plurality of sensors and the warning device, the controller configured to initiate a warning of debris using the warning device.

21. The debris monitoring system of claim 20, wherein the warning device is a visual warning viewed by an operator of an aircraft propelled by the engine.

22. The debris monitoring system of claim 20, wherein the controller is configured to determine whether another engine has a change in conditions of the engine that varies from a predicted change in condition from the engine prior to generating the warning of debris using the warning device.

* * * * *

UNITED STATES PATENT AND TRADEMARK OFFICE
CERTIFICATE OF CORRECTION

| | | |
|---|---|---|
| PATENT NO. | : 8,869,603 B2 | Page 1 of 1 |
| APPLICATION NO. | : 13/409036 | |
| DATED | : October 28, 2014 | |
| INVENTOR(S) | : Alan H. Epstein et al. | |

It is certified that error appears in the above-identified patent and that said Letters Patent is hereby corrected as shown below:

IN THE CLAIMS:

In claim 20, column 10, line 8; delete "Chan. e" and replace with --change--

Signed and Sealed this

Thirty-first Day of March, 2015

Michelle K. Lee
*Director of the United States Patent and Trademark Office*